US009209516B2

(12) United States Patent
Tramoni

(10) Patent No.: US 9,209,516 B2
(45) Date of Patent: Dec. 8, 2015

(54) METHOD OF CHECKING THE MATCHING OF AN ANTENNA CONNECTED TO A NFC COMPONENT AND CORRESPONDING NFC COMPONENT

(71) Applicant: STMicroelectronics (Rousset) SAS, Rousset (FR)

(72) Inventor: Alexandre Tramoni, Le Beausset (FR)

(73) Assignee: STMicroelectronics (Rousset) SAS, Rousset (FR)

(*) Notice: Subject to any disclaimer, the term of this patent is extended or adjusted under 35 U.S.C. 154(b) by 336 days.

(21) Appl. No.: 13/938,024

(22) Filed: Jul. 9, 2013

(65) Prior Publication Data
US 2014/0022143 A1    Jan. 23, 2014

(30) Foreign Application Priority Data
Jul. 23, 2012   (FR) .................................... 12 57123

(51) Int. Cl.
| H04B 7/00 | (2006.01) |
| H04B 5/00 | (2006.01) |
| H01Q 1/50 | (2006.01) |
| H04B 17/12 | (2015.01) |
| H04B 17/18 | (2015.01) |
| H04B 17/21 | (2015.01) |

(52) U.S. Cl.
CPC .............. *H01Q 1/50* (2013.01); *H04B 5/0043* (2013.01); *H04B 5/0081* (2013.01); *H04B 17/12* (2015.01); *H04B 17/18* (2015.01); *H04B 17/21* (2015.01)

(58) Field of Classification Search
CPC .............. H03H 7/40; H04B 5/00; H04B 7/00
USPC ................................................ 455/41.1, 41.2
See application file for complete search history.

(56) References Cited

U.S. PATENT DOCUMENTS

| 6,340,932 | B1* | 1/2002 | Rodgers et al. ............. 340/572.7 |
| 2008/0061148 | A1* | 3/2008 | Tanner ........................ 235/492 |
| 2010/0207735 | A1 | 8/2010 | Kim |
| 2012/0106219 | A1* | 5/2012 | Okuda ........................ 363/127 |
| 2012/0200472 | A1 | 8/2012 | Tramoni et al. |
| 2012/0235567 | A1* | 9/2012 | Karalis et al. ................ 315/70 |
| 2013/0109305 | A1* | 5/2013 | Savoj et al. ................. 455/41.1 |

FOREIGN PATENT DOCUMENTS

| EP | 2 328 254 A2 | 6/2011 |
| EP | 2 339 501 A1 | 6/2011 |
| EP | 2 450 835 A2 | 9/2012 |

OTHER PUBLICATIONS

French Search Report received in Application No. 1257123, mailed May 14, 2013, 9 pages.
STMicroelectronics "Near field communication microcontroller," ST2INFCA, Feb. 2012, 5 pages.

* cited by examiner

*Primary Examiner* — Ping Hsieh
*Assistant Examiner* — Xin Jia
(74) *Attorney, Agent, or Firm* — Slater & Matsil, LLP

(57) ABSTRACT

An NFC component includes a first interface that can be used in reader mode and is configured to be connected to an antenna via an impedance matching external circuit. A second interface can be used in card mode and in reader mode and is configured to be connected to the antenna and to the first interface via the impedance matching external circuit. An internal module includes a first detection circuit configured to deliver a first detection signal that represents the phase antenna matching quality when the impedance matching external circuit and the antenna are indeed connected between the first interface and the second interface. The internal module is further configured to deliver a check signal from at least the first detection signal.

28 Claims, 3 Drawing Sheets

METHOD OF CHECKING THE MATCHING OF AN ANTENNA CONNECTED TO A NFC COMPONENT AND CORRESPONDING NFC COMPONENT

CROSS-REFERENCE TO RELATED APPLICATIONS

This application claims priority to France Patent Application 1257123, which was filed Jul. 23, 2012 and is incorporated herein by reference.

TECHNICAL FIELD

The invention relates to electronic components and, in particular embodiments to a method of checking the matching of an antenna connected to an NFC component and a corresponding NFC Component.

BACKGROUND

Electronic components can be connected to an antenna. Certain components are configured to exchange information with an external device via the antenna according to a contactless communication protocol. Such components are more simply called, through misuse of language, "contactless components" and can be, for example, so-called "NFC" components, i.e., components compatible with NFC (Near Field Communication) technology. One type of NFC component is an NFC microcontroller.

The acronym NFC (Near Field Communication) refers to a short-distance, high-frequency, wireless communication technology for exchanging data between two contactless devices over a short distance, for example 10 cm.

NFC technology is standardized in documents ISO/IEC 18 092 and ISO/IEC 21 481 but incorporates a variety of pre-existing standards including the Type A and Type B protocols of the ISO/IEC 14 443 standard.

AN NFC microcontroller can be generally used either in "reader" mode or in "card" mode, in order to communicate with another contactless device, for example by using a contactless communication protocol such as the Type A protocol of the ISO/IEC 14 443 standard.

In the "reader" mode, the NFC component acts like a reader with regard to the contactless external device, which can then be a card or a tag. In the reader mode, the NFC component can then read the content of the external device and write information in the external device.

In the "card" mode, the NFC component then behaves like a card or a tag and communicates with the external device which, on this occasion, is a reader.

AN NFC microcontroller can, for example, be incorporated in a cellular mobile phone, and the latter can be used then, in addition to the conventional phone function thereof, to exchange information with the contactless external device.

Many uses are therefore possible, such as getting through transport toll barriers (the mobile phone acts as a transport ticket) or payment uses (the mobile phone acts as a credit card).

Contactless components, such as NFC components, are generally connected to the antenna via an impedance matching circuit with the aim of optimizing radio frequency communication. Furthermore, these external components used in this impedance matching circuit must be extremely well dimensioned, so as to provide maximum performance.

SUMMARY OF THE INVENTION

When the component must be integrated, industrial production problems can arise. Indeed, it is desirable to be able to check that the impedance matching circuit is correctly produced and operates correctly in production, and that there is not, consequently, matching problems due, for example, to a problem of soldering components.

According to one embodiment, a contactless component is proposed, for example an NFC component, which can detect in situ the antenna matching quality.

According to another embodiment, a contactless component is proposed, such as an NFC component, which can adjust in situ, in real time, the matching of the antenna such as to maintain extremely good performance on the radio frequency communication level.

According to one embodiment, a contactless component is proposed, for example an NFC component, comprising a first interface that can be used in reader mode (interface TX) and is intended to be connected to an antenna via an impedance matching external circuit, and a second interface that can be used in card mode and in reader mode (interface RX) and is intended to be connected to the antenna and to the first interface via the impedance matching external circuit.

According to a general feature of this aspect, the component further includes an internal module comprising at least a first detection circuit configured to deliver a first detection signal that represents the phase antenna matching quality, when the impedance matching external circuit and the antenna are indeed connected between the first interface and the second interface; the internal module being furthermore configured to deliver a check signal from at least the first detection signal.

When there is only interest in the phase antenna matching quality, the check signal is the first detection signal.

Nonetheless, it is also particularly advantageous, according to another embodiment, that the internal module further includes a second detection circuit that is configured to deliver a second detection signal that represents the amplitude antenna matching quality when the impedance matching external circuit and the antenna are indeed connected between the first interface and the second interface.

The internal module is then furthermore configured to deliver the check signal from the first detection signal and from the second detection signal.

According to an embodiment, the first detection circuit (detection of the phase matching) includes a generator configured to generate, on the first interface, a first voltage signal comprising rising edges, and a first processing block connected to the generator and to the second interface, in order to receive, at the second interface, a second voltage signal resulting from the generation of the first voltage signal on the first interface.

This first processing block comprises a development unit that is configured to develop predefined time windows about maximum values, respectively, of the second voltage signal, and a first detection module that is configured to deliver a first detection signal having a first state when the position of a rising edge of the first voltage signal is located inside a time window.

According to one embodiment, the development unit includes a rectifying module, for example a bridge of diodes, which is connected to the second interface and intended to deliver a second voltage rectified signal having a voltage predefined level. The development unit also includes a comparator having a first input connected to the output of the rectifying module and a second input connected to the second interface. The first detection module then comprises a logic gate having a first input connected to the output of the comparator and a second input connected to the output of the generator.

With regards to the second detection circuit (detection of the amplitude matching), this circuit includes, according to an embodiment, a second comparator configured to compare the value of the second rectified signal with a reference value and to deliver the second detection signal having a first state if the value of the second rectified signal is greater than the reference value.

According to a particularly advantageous embodiment, the component further includes a matching adjusting circuit that is configured to adjust the antenna matching on the basis of the check signal delivered by the internal module.

In a way, this enables in situ and real time automatic adjusting to be carried out, which allows the radio frequency performance to be improved, and the interoperability of the component to be increased while preventing mismatching for contactless products having an extremely low consumption. This furthermore allows the consumption of the reader to be improved.

The adjusting circuit can include, for example, an internal circuit of switched capacitors, which is connected between the two interfaces and between the two terminals of the second interface. A control circuit can be configured to control the switching of the capacitors on the basis of at least one signal from the group formed by the check signal and the two detection signals.

According to another aspect, a system is proposed that includes a component as defined above. An antenna is connected to the second interface of the component and an impedance matching external circuit is connected to the first interface of the component as well as to the antenna.

According to another aspect, an apparatus is also proposed. As but one example, a cellular mobile phone can comprise a system as defined above.

According to another aspect, a method is proposed for checking the matching of an antenna, connected via an impedance matching external circuit to a first interface of an NFC component which can be used in reader mode and connected to a second interface of the NFC component which can be used in card mode and in reader mode. The method includes at least a first development within the NFC component of a first detection signal representing the phase antenna matching quality and a development of a check signal from the first detection signal.

According to one manner of implementation, the first development includes generating, on the first interface, a first voltage signal comprising rising edges, receiving, at the second interface, a second voltage signal resulting from generating the first voltage signal on the first interface, and delivering the first detection signal in a first state when the position of a rising edge of the first voltage signal is located inside a predefined time window of a maximum value of the second voltage signal.

According to a manner of implementation, the method further includes a second development, within the NFC component, of a second detection signal representing the amplitude antenna matching quality and a third development of an overall detection signal (or check signal) representing the phase and amplitude antenna matching quality on the basis of the first detection signal and the second detection signal.

According to a manner of implementation, the second development includes a comparison of the value of the second voltage rectified signal with a reference value and delivery of the second detection signal in a first state if the value of the second rectified signal is greater than the reference value.

According to a manner of implementation, the method further includes an adjustment of the matching of the antenna on the basis of the check signal.

According to a manner of implementation, the adjustment comprises switching at least one switched capacitor of an internal circuit of switched capacitors which is connected between the two interfaces and between the two terminals of the second interface of the NFC component, the switching being controlled from at least one signal from the group formed by the check signal and the two detection signals.

BRIEF DESCRIPTION OF THE DRAWINGS

Other advantages and features of the invention will emerge in the detailed description of embodiments and manners of implementation, which are in no way limiting, and of the appended drawings wherein.

DETAILED DESCRIPTION OF ILLUSTRATIVE EMBODIMENTS

Figure 1:
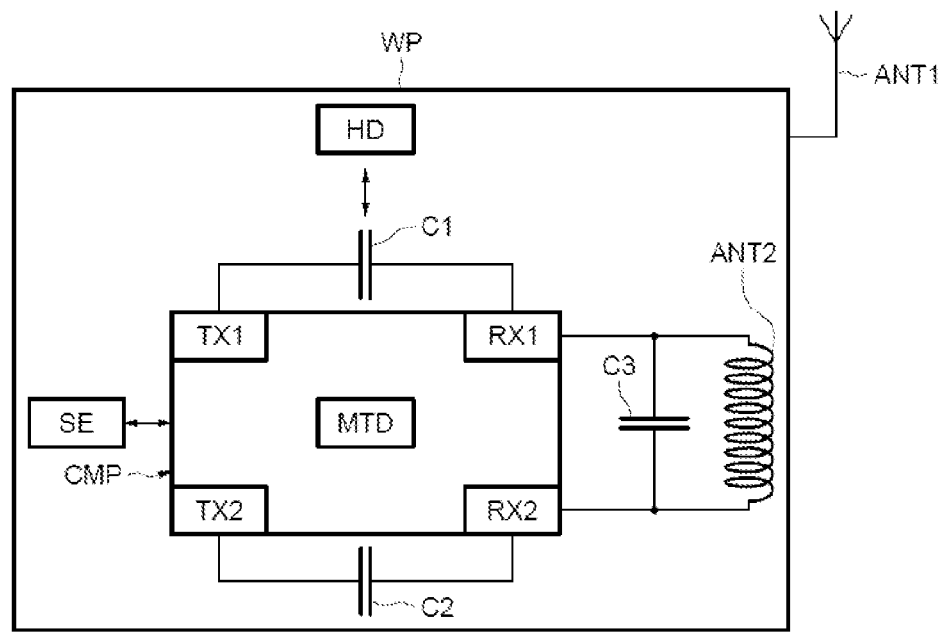
FIGS. 1-5 schematically illustrate various embodiments of an NFC component according to the invention and various manners of implementing the method according to the invention.

In FIG. 1, the reference WP refers, in this case, to a communication apparatus, for example a cellular mobile phone, provided with an antenna ANT1 for establishing telephone communication.

In the present case, the phone WP also comprises an NFC system comprising an NFC contactless component CMP, for example, an NFC microcontroller. The microcontroller CMP has a first interface formed, in this case, from two contacts TX1, TX2, which can be used in reader mode and a second interface formed, in this case, from two other contacts RX1, RX2, which can be used in reader mode and in card mode.

In this respect, the component CMP can be provided with an internal switch for bypassing the terminals TX1 and TX2 for operating in card mode, or for not bypassing the terminals to allow operation in reader mode.

A capacitor C1 is connected between the contacts TX1 and RX1. Likewise, a capacitor C2 is connected between the contacts TX2 and RX2 and a capacitor C3 is connected between the contacts RX1 and RX2 of the second interface.

Finally, an antenna ANT2 which can be used for contactless communication with an external device is connected between the two terminals RX1, RX2 of the second interface.

The capacitors C1, C2, C3 form, in this case, an impedance matching external circuit.

For optimized operation, the component CMP forms, with the antenna and the impedance matching external circuit, a resonant circuit having a resonance frequency f equal to the carrier frequency, for example 13.56 MHz in the case of a Type A or B communication protocol defined in the standard ISO/IEC 14 443.

Nonetheless, in the case of a Type A transmission protocol, resonance frequencies contained in a range of more or less 15% about the carrier frequency can be considered to be acceptable resonance frequencies.

In addition to the conventional and known means forming the internal structure of an NFC microcontroller, which can, for example, be those of the microcontroller marketed by the company STMicroelectronics under the reference ST 21 NFC A. The component CMP comprises, in this case, an internal module MTD, the structure and functionality of which will be described in greater detail hereafter, and which is intended to deliver a check signal representing the phase and/or amplitude antenna matching quality.

Finally, as is conventional in some cases, the NFC microcontroller CMP communicates with a host device HD, such as a microprocessor, which is intended in particular to manage the user interface, as well as with a SE, or UICC, Secure Element. UICC as defined in the document ETSI TR 102 216 V3.0.0 (09 2003), which is neither an abbreviation nor an acronym, refers to a chip card in accordance with the specifications written and maintained by the technical committee ETSI SCP (Smart Card Platform).

Figure 2:
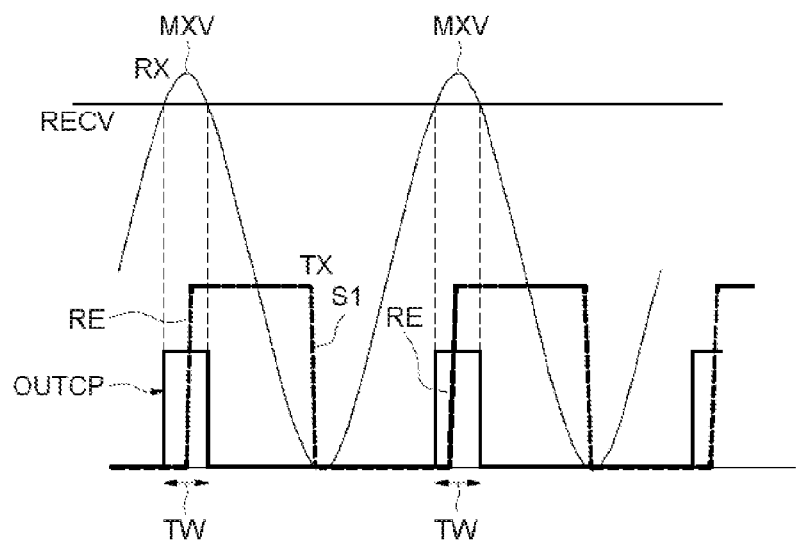

FIG. 2 schematically illustrates a case where the phase antenna matching is correct.

More precisely, in the case of a communication protocol using a carrier frequency of 13.56 MHz, when a first square pulse voltage signal S1 is transmitted on the first interface TX1, TX2, which has rising edges RE separated by 70 nanoseconds (corresponding to the frequency of 13.56 MHz), received at the second interface RX1, RX2, taking into account the presence of the matching external circuit C1-C3 and the antenna ANT2, is a second, sinusoidal, voltage signal S2, the peaks or maximum values MXV of which are equally spaced by 70 nanoseconds (corresponding to the carrier frequency of 13.56 MHz).

Perfect phase matching of the antenna results in an alignment of rising edges RE of the first signal S1 with the respective maximum values MXV of the signal S2.

Nonetheless, it is considered in this case that the phase matching is correct if the rising edges RE of the first signal S1 are located inside time windows TW about the maximum values MXV, respectively, of the second signal S2.

In the example described in this case, as will be seen in greater detail hereafter, the width of the window is defined by the value of a voltage RECV corresponding to the voltage value of the second rectified signal S2.

The higher the value RECV is in relation to the maximum value MXV, the narrower the window TW is, and the lower the value RECV is in relation to the maximum value MXV, the wider the window TW is.

In practice, a window TW is chosen, for example, that has a width of 10 nanoseconds, which corresponds to a maximum value MXV in the region of 10-12 volts, and to a value RECV in the region of 9-11 volts.

Furthermore, a first detection signal will be developed within the NFC component, which represents the phase antenna matching quality. Moreover, as will be seen in greater detail hereafter, this first detection signal is a digital signal which has a first state (for example, the logical value "1") when the position of a rising edge RE of the first voltage signal S1 is located inside the corresponding time window TW, which corresponds then to correct phase matching.

Figure 3:
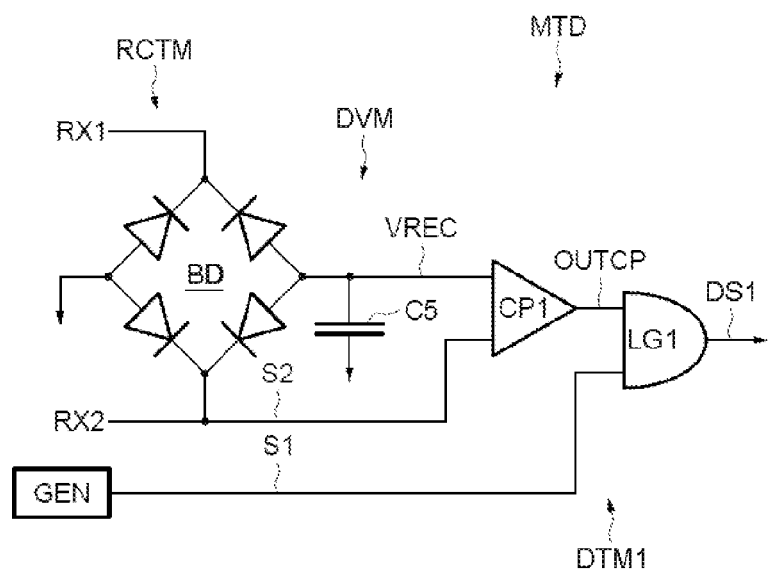

In practice, the first detection circuit DTM1, which delivers the first detection signal DS1, can be produced as illustrated schematically in FIG. 3.

More precisely, the first detection circuit DTM1 comprises a generator GEN delivering the first voltage signal Si on the first interface TX1, TX2.

The first detection circuit DTM1 also comprises a development circuit DVM that is configured to develop the predefined time windows TW.

These development circuit DVM comprises, in this case, a rectifying module RCTM formed by a bridge of diodes BD, which are connected between the two contacts RX1, RX2 of the second interface. The output of the bridge circuit BD is connected to a capacitor C5.

The development circuit DVM also comprises a comparator CP1 having a first input connected to the output of the rectifying module RCTM to receive the second voltage rectified signal RECV, and a second input connected to the second interface (here to the contact RX2) in order to receive the second unrectified signal S2.

It is therefore seen, as illustrated in FIG. 2, that the output OUTCP of the comparator CP1 is at "1" when the signal S2 is above the rectified voltage RECV, which indeed allows the time window to be defined.

The first detection circuit DTM1 also comprises, in this case, an AND logic gate, referenced as LG1, having an input connected to the output of the comparator CP1 and another input connected to the output of the generator GEN.

This logic gate LG1 forms, in this case, a detection module configured to deliver the first detection signal DS1.

This first detection signal DS1 has a first state (logical value 1) when the two inputs of the logic gate LG1 are at "1", which corresponds to a rising edge RE of the first voltage signal S1 located inside a time window TW.

Figure 4:
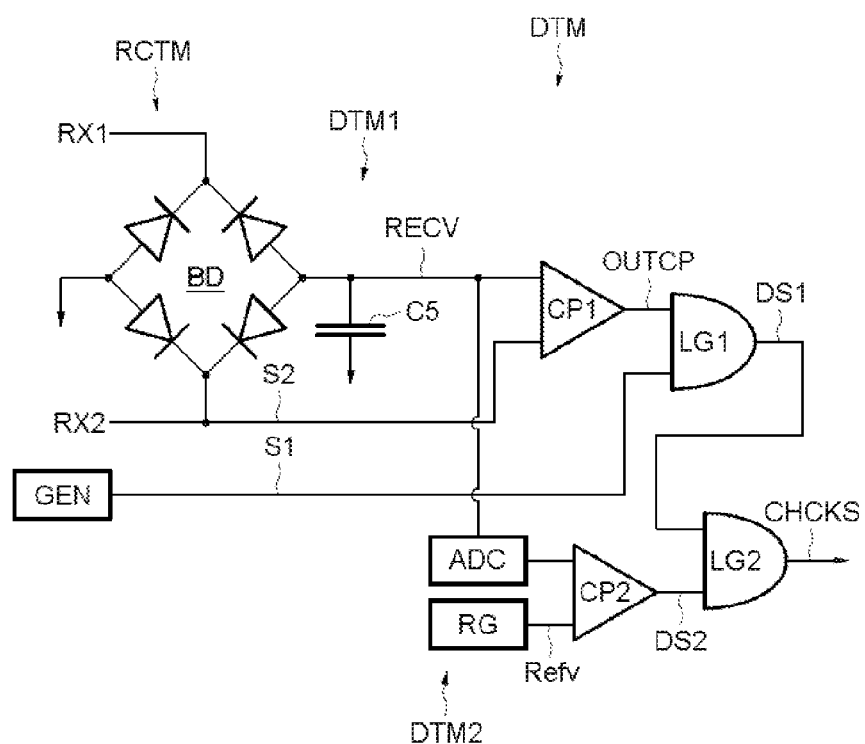

The embodiment illustrated in FIG. 4 allows for simultaneous detection of good phase antenna matching and good amplitude antenna matching.

Indeed, the amplitude of the second voltage rectified signal RECV depends on the antenna used. Furthermore, if a soldering fault appears at a component of the antenna matching external circuit, this can result in a reduction of the level of signal S2 and, consequently, of the level of the rectified signal S2, i.e., the voltage RECV.

This is the reason why second detection circuit DTM2 is provided within the internal module MTD, which are configured to deliver a second detection signal DS2, which represents the amplitude antenna matching quality.

The development of this second detection signal DS2 includes a comparison of the value of the second rectified voltage signal RECV with a reference value Refv. The second detection signal DS2 will then have a first state (for example, logical value "1") if the rectified value of the second signal RECV is greater than the reference value Refv, corresponding to correct amplitude matching.

As an indication, Refv can be chosen in the region of 85% of RECV.

In practice, the second detection circuit DTM2 can include, as illustrated in FIG. 4, a register RG storing the reference value Refv as well as an analog-to-digital converter ADC connected to the output of the rectifying module RCTM and intended to digitize the second rectified voltage signal RECV.

A second comparator CP2 has a first input connected to the output of the converter ADC and a second input connected to the output of the register RG.

The output of the comparator CP2 delivers the second detection signal DS2.

It is also possible, as illustrated in FIG. 4, to deliver a check signal CHCKS, which represents both the amplitude and phase antenna matching quality.

This check signal CHCKS is developed from the signals DS1 and DS2. In practice, an output circuit, formed in this case by an AND logic gate, referenced as LG2, receives the signal DS1 and the signal DS2 and deliver the check signal CHCKS.

When the two signals DS1 and DS2 are in the first state thereof (logical value "1" for example), the signal CHCKS is then also in a first state (logical value "1").

It is, furthermore, particularly advantageous to be able to adjust the matching of the antenna in situ, in real time, to take into account possibly the dispersion of the components of the matching external circuit and to take into account possibly loading of the component by an external product located in the field of the antenna.

Figure 5:
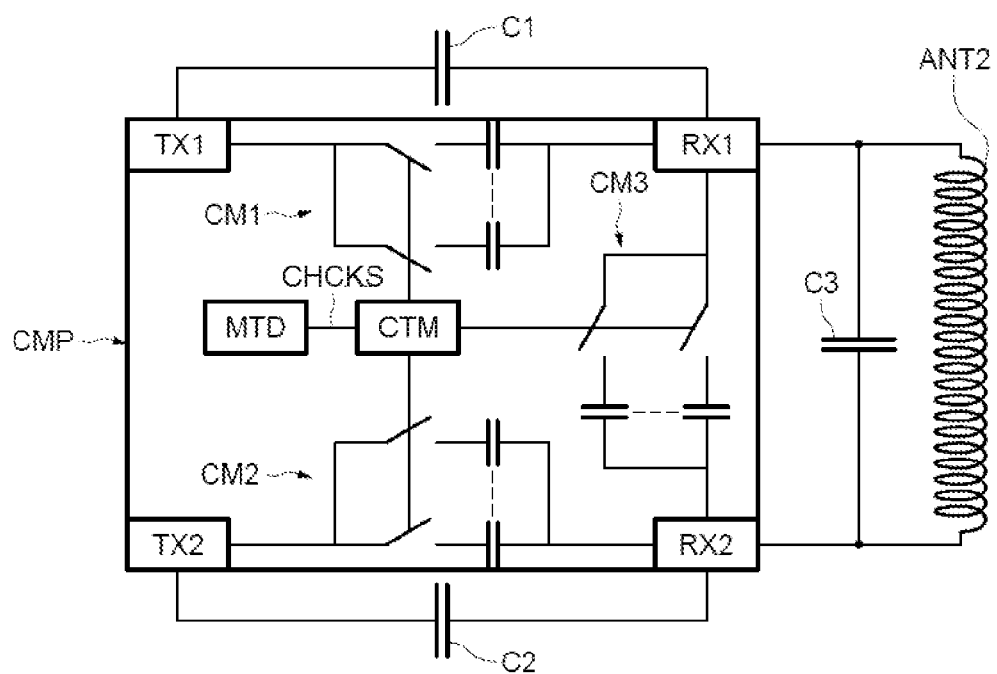

More precisely, as illustrated in FIG. 5, the component CMP comprises a mechanism for adjusting the impedance comprising, in this case, an internal circuit of switched capacitors. This internal circuit of switched capacitors comprises a first set CM1 and a second set CM2 of switched capacitors connected between the two interfaces RX1, TX1 and RX2, TX2, as well as a third set of switched capacitors CM3, which is connected between the two terminals RX1 and RX2 of the second interface.

These various sets of switched capacitors are controlled by a control circuit and, the switching of the various capacitors can be carried out on the basis of the value of the check signal CHCKS delivered by the internal module MTD.

The switching of one at least of the capacitors of the set CM3 will be paramount for phase adjustment, whereas the switching of one at least of the capacitors of the sets CM1 and CM2 will be paramount for amplitude adjustment.

A first solution for carrying out this adjustment can consist in testing the switching of the various switched capacitors in a predefined order each time that the value of the signal CHCKS is equal to "0", and stopping the procedure as soon as the signal CHCKS returns to 1. Another solution could consist in analyzing both the signal CHCKS and the signals DS1 and DS2 in order to determine the source of the incorrect matching and adjusting the procedure of switching the capacitors as a result.

What is claimed is:

1. An NFC component comprising:
   a first interface that can be used in reader mode and is configured to be connected to an antenna via an external impedance matching circuit;
   a second interface that can be used in card mode and in reader mode and is configured to be connected to the antenna and to the first interface via the impedance matching external circuit; and
   an internal module comprising a first detection circuit configured to deliver a first detection signal having a first state when a position of a rising edge of a first voltage signal at the first interface is located inside a time window of a resulting second voltage signal at the second interface.

2. The NFC component according to claim 1, wherein the internal module is further configured to deliver a check signal from at least the first detection signal.

3. The NFC component according to claim 2, further comprising an internal matching adjustment circuit configured to adjust the antenna matching based upon the check signal.

4. The NFC component according to claim 1, further comprising an internal matching adjustment circuit that comprises:
   a circuit of switched capacitors coupled between the first and second interfaces and between terminals of the second interface; and
   a control circuit configured to control the switching of the capacitors.

5. The NFC component according to claim 1, wherein the first detection circuit comprises:
   a generator configured to generate, on the first interface, the first voltage signal comprising rising edges;
   a first processing block coupled to the generator and to the second interface and configured to receive, at the second interface, the second voltage signal resulting from the generation of the first voltage signal on the first interface;
   a development circuit configured to develop predefined time windows about maximum values, respectively, of the second voltage signal; and
   a first detection module configured to deliver the first detection signal having the first state when the position of the rising edge of the first voltage signal is located inside the time window.

6. The NFC component according to claim 5, wherein the development circuit comprises:
   a rectifying module coupled to the second interface and configured to deliver a second voltage rectified signal having a voltage predefined level; and
   a comparator having a first input coupled to an output of the rectifying module and a second input coupled to the second interface.

7. The NFC component according to claim 6, wherein the detection module comprises a logic gate having a first input connected to the output of the comparator and a second input connected to the output of the generator.

8. The NFC component according to claim 1, wherein the internal module further comprises second detection circuit configured to deliver a second detection signal that represents an amplitude antenna matching quality when the impedance matching external circuit and the antenna are indeed connected between the first interface and the second interface.

9. The NFC component according to claim 8, wherein the internal module is configured to deliver a check signal from the first detection signal and from the second detection signal.

10. The NFC component according to claim 9, wherein the second detection circuit includes a second comparator configured to compare a value of a second rectified signal with a reference value and to deliver the second detection signal, which has a first state when the value of the second rectified signal is greater than the reference value.

11. The NFC component according to claim 10, wherein the internal module includes an output circuit configured to deliver the check signal with a first state when the first detection signal and the second detection signal are both in the first state thereof.

12. The NFC component according to claim 8, wherein the internal module is further configured to deliver a check signal from at least the first detection signal and wherein the NFC component further comprises a matching adjustment circuit configured to adjust the antenna matching based upon the check signal delivered by the internal module.

13. The NFC component according to claim 12, wherein the matching adjustment circuit comprises:
   a circuit of switched capacitors coupled between the first and second interfaces and between terminals of the second interface; and
   a control circuit configured to control the switching of the capacitors based upon at least one of the check signal, the first detection signal or the second detection signal.

14. The NFC component according to claim 1, wherein the first detection signal represents a phase antenna matching quality when the external impedance matching circuit and the antenna are indeed connected between the first interface and the second interface.

15. The NFC component according to claim 1, wherein the first detection circuit is further configured to deliver the first detection signal having an opposite second state when the position of the rising edge of the first voltage signal is located outside the time window of the resulting second voltage signal.

16. A system comprising:
   the NFC component according to claim 1;
   the antenna connected to the second interface of the component; and
   the external impedance matching circuit connected to the first interface of the component as well as to the antenna.

17. An apparatus comprising:
   the NFC component according to claim 1;
   the antenna connected to the second interface of the component; and the external impedance matching circuit connected to the first interface of the component as well as to the antenna.

18. The apparatus according to claim 17, wherein the apparatus comprises a cellular mobile phone.

19. A method of checking matching of an antenna, connected via an external impedance matching circuit to a first interface of an NFC component that can be used in reader mode and connected to a second interface of the NFC component that can be used in card mode and in reader mode, the method comprising:
generating a detection signal within the NFC component, the detection signal having a first state when a position of a rising edge of a first voltage signal at the first interface is located inside a time window of a resulting second voltage signal at the second interface, the first state indicative of a phase antenna matching quality; and
generating a check signal based upon the detection signal.

20. The method according to claim 19, wherein generating the detection signal comprises:
generating, on the first interface, the first voltage signal comprising rising edges;
receiving, at the second interface, the second voltage signal resulting from generating the first voltage signal on the first interface; and
delivering the detection signal in a first state when the position of the rising edge of the first voltage signal is located inside a predefined time window of a maximum value of the second voltage signal.

21. The method according to claim 19, further comprising generating a second detection signal within the NFC component, the second detection signal representing and amplitude antenna matching quality.

22. The method according to claim 21, wherein generating the check signal comprises generating an overall detection signal that represents the phase and amplitude antenna matching quality based on the detection signal and the second detection signal.

23. The method according to claim 21, wherein generating the second detection signal comprises comparing a value of a second voltage rectified signal with a reference value and delivering the second detection signal in a first state when the value of the second voltage rectified signal is greater than the reference value.

24. The method according to claim 21, further comprising adjusting the matching of the antenna based upon at least one of the check signal, the detection signal or the second detection signal.

25. The method according to claim 24, wherein the adjusting comprises switching at least one switched capacitor of an internal circuit of switched capacitors that are connected between the first and second interfaces and between terminals of the second interface of the NFC component, the switching being controlled by at least one of the check signal, the detection signal or the second detection signal.

26. The method according to claim 19, further comprising adjusting the matching of the antenna based upon at least one of the check signal or the detection signal.

27. The method according to claim 19, wherein the first detection circuit is further configured to deliver the first detection signal having an opposite second state when the position of the rising edge of the first voltage signal is located outside the time window of the resulting second voltage signal.

28. An apparatus comprising:
a first interface that can be used in reader mode and a second interface that can be used in card mode and in reader mode;
an antenna coupled to the second interface and coupled via an external impedance matching circuit to the first interface;
means for generating a detection signal having a first state when a position of a rising edge of a first voltage signal at the first interface is located within a time window of a resulting second voltage signal at the second interface, the first state being indicative of a phase antenna matching quality; and
means for generating a check signal based upon the detection signal.

* * * * *